(12) United States Patent
Weisenborn et al.

(10) Patent No.: US 12,110,958 B2
(45) Date of Patent: Oct. 8, 2024

(54) BELT PULLEY DECOUPLER WITH A MOUNTING PLATE, ATTACHED TO A HUB CONSTITUENT PART, OF A VIBRATION ABSORBER

(71) Applicant: Schaeffler Technologies AG & Co. KG, Herzogenaurach (DE)

(72) Inventors: Roman Weisenborn, Achern (DE); Pascal Strasser, Aschbach (FR); Andreas Stuffer, Weingarten (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/024,837

(22) PCT Filed: Jul. 15, 2021

(86) PCT No.: PCT/DE2021/100620
§ 371 (c)(1),
(2) Date: Mar. 6, 2023

(87) PCT Pub. No.: WO2022/053097
PCT Pub. Date: Mar. 17, 2022

(65) Prior Publication Data
US 2024/0019019 A1    Jan. 18, 2024

(30) Foreign Application Priority Data

Sep. 8, 2020  (DE) ...................... 10 2020 123 393.0
Oct. 15, 2020 (DE) ...................... 10 2020 127 092.5

(51) Int. Cl.
*F16H 55/36* (2006.01)

(52) U.S. Cl.
CPC ....... *F16H 55/36* (2013.01); *F16H 2055/366* (2013.01)

(58) Field of Classification Search
CPC .. F16H 55/36; F16H 2055/366; F16D 41/206; F16D 3/12; F16D 3/66
(Continued)

(56) References Cited

U.S. PATENT DOCUMENTS

| 6,106,421 A * | 8/2000 | Graber .................... F16H 55/36 |
| | | 474/94 |
| 6,582,333 B2 * | 6/2003 | Man ......................... B60K 6/48 |
| | | 903/910 |

(Continued)

FOREIGN PATENT DOCUMENTS

| DE | 102011086911 A1 | 6/2012 |
| DE | 102017115466 A1 | 1/2019 |

*Primary Examiner* — Henry Y Liu

(57) ABSTRACT

The disclosure relates to a belt pulley decoupler for a motor vehicle drive train that includes a hub constituent part configured for attachment to a crankshaft of an internal combustion engine, a flexible drive element pulley supported in a spring-damped manner relative to the hub constituent part, and a vibration absorber. The vibration absorber includes a mounting plate that extends from a fastening region, which is supported on the hub constituent part and connected to the hub constituent part in a positively locking and/or non-positive manner, radially outwards to a collar region which receives at least one mass element. The fastening region has a plate portion which is supported axially on a flange element of the hub constituent part and which is held relative to the hub constituent part via an axially running dome portion formed either by the mounting plate or the flange element.

20 Claims, 5 Drawing Sheets

(58) Field of Classification Search
USPC .................................................. 474/94, 70
See application file for complete search history.

(56) References Cited

U.S. PATENT DOCUMENTS

| | | | | |
|---|---|---|---|---|
| 6,702,681 B1* | 3/2004 | Ochs | .................. | F16H 55/36 464/7 |
| 7,114,585 B2* | 10/2006 | Man | .................. | B60K 6/365 903/910 |
| 7,591,357 B2* | 9/2009 | Antchak | .................. | F16F 15/12 192/81 C |
| 7,618,337 B2* | 11/2009 | Jansen | .................. | F02B 67/06 192/81 C |
| 8,789,670 B2* | 7/2014 | Antchak | .................. | F16D 41/206 192/55.61 |
| 10,030,757 B2* | 7/2018 | Manzoor | .................. | F16H 55/36 |
| 10,378,620 B2* | 8/2019 | Tran | .................. | F16D 3/12 |
| 10,697,531 B2* | 6/2020 | Wick | .................. | F16H 55/36 |
| 11,287,024 B2* | 3/2022 | Rasch | .................. | F16H 55/36 |
| 2006/0172832 A1* | 8/2006 | Watanabe | .................. | F16F 15/1442 474/94 |
| 2006/0264282 A1* | 11/2006 | Moriya | .................. | F16H 55/36 474/94 |
| 2008/0312015 A1* | 12/2008 | Schebitz | .................. | F16F 15/121 474/94 |
| 2010/0099527 A1* | 4/2010 | Rolando | .................. | F16H 55/36 474/94 |
| 2011/0263365 A1* | 10/2011 | Mende | .................. | F16F 15/1297 474/94 |
| 2011/0315502 A1* | 12/2011 | Antchak | .................. | F16D 43/24 192/75 |
| 2012/0015768 A1* | 1/2012 | Serkh | .................. | F16H 55/36 474/94 |
| 2012/0094791 A1* | 4/2012 | Lee | .................. | F16H 55/36 474/94 |
| 2012/0231909 A1* | 9/2012 | Shin | .................. | F16F 15/126 474/94 |
| 2013/0284139 A1* | 10/2013 | Staley | .................. | F16F 15/1442 474/94 |
| 2015/0024885 A1* | 1/2015 | Odenmarck | .................. | F16D 3/84 474/94 |
| 2015/0354689 A1* | 12/2015 | Manzoor | .................. | F16F 15/1209 474/94 |
| 2016/0102730 A1* | 4/2016 | Manzoor | .................. | F16F 15/126 464/99 |
| 2016/0146328 A1* | 5/2016 | Dell | .................. | B60K 25/02 474/94 |
| 2016/0153542 A1* | 6/2016 | Wick | .................. | F16H 55/36 474/94 |
| 2019/0226570 A1* | 7/2019 | Rasch | .................. | F16H 55/36 |

* cited by examiner

BELT PULLEY DECOUPLER WITH A MOUNTING PLATE, ATTACHED TO A HUB CONSTITUENT PART, OF A VIBRATION ABSORBER

CROSS-REFERENCE TO RELATED APPLICATIONS

This application is the U.S. National Phase of PCT Application No. PCT/DE2021/100620 filed on Jul. 15, 2021, which claims priority to DE 10 2020 123 393.0 filed on Sep. 8, 2020, and DE 10 2020 127 092.5 filed on Oct. 15, 2020, the entire disclosures of which are incorporated by reference herein.

TECHNICAL FIELD

The disclosure relates to a belt pulley decoupler for a drive train of a motor vehicle.

BACKGROUND

A generic belt pulley decoupler 1' known from the prior art, as is already known, is shown in FIGS. 8 and 9. It is clear from these figures that previously, when assembling the belt pulley decoupler 1' on the internal combustion engine, a separately manufactured counter-holder G was kept available, via which a counter-holder tool was used to set a rotational alignment of a vibration absorber 4' with respect to a hub constituent part 2' of the belt pulley decoupler 1'. For this purpose, the counter-holder G is attached to the mounting plate 5' by means of a riveted connection N. However, it emerged that this connection of the separate counter-holder G has a negative influence on the maximum torque that can be transmitted.

SUMMARY

It is therefore the object of the present disclosure to provide a belt pulley decoupler which has a design which is as robust as possible for the transmission of higher torques.

According to the disclosure, this is achieved in that the fastening region has a plate portion which is supported axially on a flange element of the hub constituent part (directly or indirectly) and is held relative to the hub constituent part via an axially running dome portion formed either by the mounting plate or the flange element.

This provides a connection between the mounting plate and the hub constituent part that can be formed as simply as possible and is selected independently of the counter-holder and is therefore implemented as robustly as possible.

Further advantageous embodiments are explained in greater detail below.

Accordingly, it is also advantageous if the dome portion, as part of the mounting plate, protrudes axially from the plate portion and is supported radially from the inside on the flange element. In return, the flange element can be designed as simply as possible.

As an alternative to this, however, it is also expedient if the dome portion protrudes axially as part of the flange element and is supported radially from the inside on the plate portion. As a result, the dome portion can be made as stable as possible.

In this context, it has also proven to be expedient if the dome portion is fastened to the flange element or the mounting plate by means of an interference fit/press connection. That interference fit is understood in particular to mean a connection that ensures that the mounting plate resists the external forces acting during transport of the assembled belt pulley decoupler and before final assembly on the crankshaft and that it remains connected to the hub constituent part/flange element. During the final assembly of the belt pulley decoupler on the crankshaft, a central screw can assume the fastening function of the hub constituent part and the mounting plate on the crankshaft.

It is also expedient if the dome portion on its support surface contacting the flange element or the mounting plate and/or the flange element or the mounting plate on its counter-support surface contacting the dome portion is/are provided with a surface structure, such as ribbing or knurling, or teeth.

Furthermore, for even simpler assembly, it is advantageous if the fastening region is provided with an undercut in a transition between the plate portion and the dome portion on a side facing the flange element. This makes it possible to form a clearance for chips.

As an alternative to this, it is also expedient if the flange element has a chamfer, rounding or embossing on its radial inner side and on the axial side facing the plate portion. This significantly simplifies the insertion of the dome portion into the hub constituent part.

It is also advantageous if the mounting plate forms a planar support area radially outside the fastening region and radially inside at least one spring element supporting the hub constituent part relative to the traction pulley, spaced axially from the hub constituent part and having at least one pegging bore. A support area is therefore provided for receiving a counter-holding tool, which is already formed integrally/in one piece of material with the mounting plate. This avoids the production of a separate counter-holder.

It is also expedient if the hub constituent part, in addition to the flange element supported directly on the at least one spring element and in contact with the mounting plate, has a main body that supports the traction pulley, with the main body and the flange element being connected to one another by means of a rivet connection. This results in a simple assembly of the hub constituent part.

In this regard, it has also emerged as being advantageous that the main body and the flange element form a receiving space that receives an intermediate piece radially within a plurality of rivet bolts realizing the rivet connection, and that the flange element has a support web that is folded over axially and is supported on the end face of the intermediate piece. This also makes it possible to make the intermediate piece shorter in the axial direction and to save weight or to adapt the mass of the hub constituent part individually. In this context, it should also be pointed out that it is in principle possible to even omit the intermediate piece and to design the support web so wide that it rests axially on a disk area of the main body that can be directly connected to the crankshaft. In this way the manufacturing effort is further simplified.

The assembly of the vibration absorber on the hub constituent part is further simplified if the hub constituent part has a through-hole that completely penetrates it radially at the height of the support area of the mounting plate. This makes it possible to fix the mounting plate and the hub constituent part directly relative to one another in the direction of rotation.

Furthermore, it is expedient if the through-hole is arranged at the same radial height as the at least one pegging bore. The hub constituent part/flange element and mounting plate can then be fixed directly to one another using a single mounting pin. It is also advantageous in this respect to design the pegging bore and the through-hole with the same diameter, at least in sections. According to further embodiments, the through-hole can also be designed with a different smaller diameter than the pegging bore. If the through-hole is implemented in a stepped manner, a stop for the mounting pin is simply implemented.

The connection between the mounting plate and the flange element is further strengthened if a wart projected on the mounting plate is received in a recess of the flange element, for example, via a press-fit.

In other words, according to the disclosure, a special connection of a torsional vibration absorber (vibration absorber) to a belt pulley decoupler is implemented without riveting. Thus, a previous riveting on the part of the torsional vibration absorber is no longer necessary and a previous separate counter-holder is integrated in a primary plate (mounting plate) of the torsional vibration absorber. The primary plate is shaped in such a way that a contact surface (support area) is formed axially for the customer's counter-holder and the desired pegging bores are provided. An inner diameter of the mounting plate is formed into a dome (dome portion) and forms an interference fit with the inner diameter of the arc spring flange (flange element of the hub constituent part). This interference fit takes over the positioning of the torsional vibration absorber in the belt pulley decoupler until the customer assembles it on the crankshaft using a central screw.

BRIEF DESCRIPTION OF THE DRAWINGS

The disclosure will now be explained in more detail with reference to figures, in which connection various exemplary embodiments are also described.

In the figures.

DETAILED DESCRIPTION

The drawings are merely schematic in nature and are therefore intended solely for the purpose of understanding the disclosure. The same elements are provided with the same reference symbols.

Figure 1:
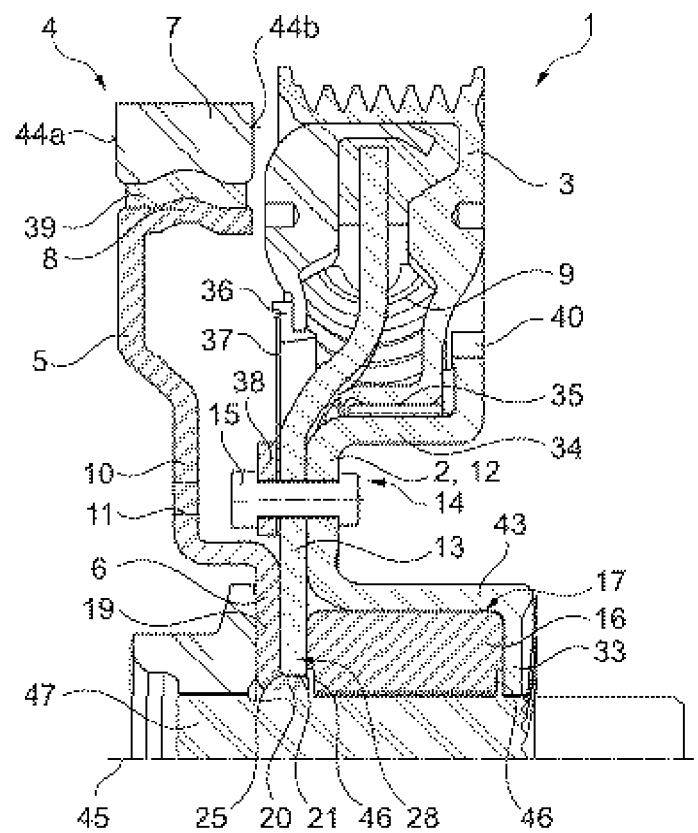
FIG. 1 shows a longitudinal sectional view of a belt pulley decoupler according to the disclosure according to a first exemplary embodiment, wherein the overall structure of the belt pulley decoupler can be clearly seen.

FIG. 1 shows a belt pulley decoupler 1 according to the disclosure, designed according to a first exemplary embodiment, with its overall structure clearly shown. The pulley decoupler 1 typically comprises a traction pulley 3 which, in use, is rotationally connected to an endless traction means, namely a belt. This traction pulley 3 is supported/mounted on a main body 12 of a hub constituent part 2 in a relatively rotatable manner. For this purpose, the main body 12 has a bearing 35 on an axial projection 34, which supports the traction pulley 3 towards the radial inner side.

For the sake of completeness, it should be pointed out that the directional information used here relates axially, radially and in the circumferential direction to an axis of rotation 45 of the belt pulley decoupler 1. Consequently, axially/axial direction is to be understood as a direction along/parallel to the axis of rotation 45; radially/a radial direction is to be understood as a direction perpendicular to the axis of rotation 45; and a circumferential direction is to be understood as a direction along an imaginary circular line that runs concentrically around the axis of rotation 45.

Furthermore, the hub constituent part 2 has a flange element 13 which is firmly connected to the main body 12 via a rivet connection 14. In FIG. 1, this riveted connection 14 with forming rivet bolt 15 can be seen in cross-section. A plurality of these riveted bolts 15 for implementing the riveted connection 14 are distributed in the circumferential direction.

Towards a radial outer side of the projection 34, the flange element 13 is resiliently supported relative to the traction pulley 3 by means of a plurality of spring elements 9 distributed in the circumferential direction. The spring elements 9 allow the traction pulley 3 to be twisted elastically relative to the hub constituent part 2 by a certain twisting angle range. A peripheral first end of the respective spring element 9 is directly in contact with the flange element 13; a peripheral second end of the respective spring element 9 is in direct contact with the traction pulley 3. Those spring elements 9 are implemented as compression springs, such as arc springs or as straight compression springs.

Furthermore, it can be seen from FIG. 1 that with the rivet bolt 15/the rivet connection 14, a disk spring 37 that prestresses a friction ring 36 axially against the traction pulley 3 is also fixed at the same time. A separate retaining ring 38 is provided for this purpose, which holds/clamps the disk spring 37 between itself and the flange element 13 in the area of the rivet connection 14. The friction ring 36, which is received on the hub constituent part 2 and is pressed into frictional contact by the plate spring 37 against the traction pulley 3, results in a spring-damped support of the traction pulley 3 relative to the hub constituent part 2.

Furthermore, a torsional vibration absorber 4 is arranged on the hub constituent part 2. In this embodiment, this vibration absorber 4 is designed as a so-called elastomer damper; in other versions, however, it can also be realized in other ways. The vibration absorber 4 can have a mounting plate 5 which is attached to the hub constituent part 2, namely to the flange element 13 here.

For fastening to the flange element 13, the mounting plate 5 has a fastening region 6 towards its radial inner side. The fastening region 6 also has a plate portion 19 which runs exclusively radially and which is located axially directly in planar contact with an axial side of the flange element 13. The fastening region 6 also has a dome portion 20 which adjoins a radial inner side of the plate portion 19 and protrudes axially away from the plate portion 19. The dome portion 20 therefore forms an axial projection of the mounting plate 5 and is connected to the flange element 13.

In this connection it should be pointed out that the dome portion 20, as realized in this embodiment, is fixed to a radial inner side 27 of the flange element 13/of the hub constituent part 2 by means of an interference fit 21. In this regard, it should be pointed out that this results in a non-positive connection of the mounting plate 5 with the flange element 13.

Figure 2:
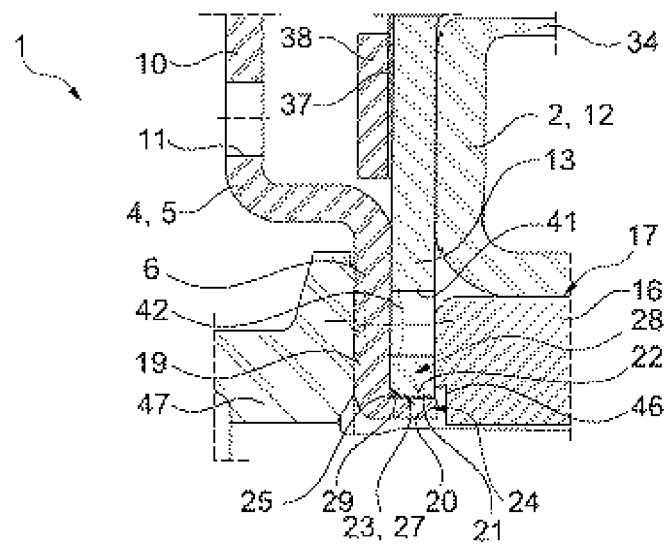
FIG. 2 shows a longitudinal section of a detail area of the belt pulley decoupler according to FIG. 1, wherein a pegging bore which has been inserted in a support area of a mounting plate can be clearly seen.

As further indicated in FIG. 2, in this embodiment a surface structure 24 is formed on the flange element 13 on the part of a support surface 22 of the dome portion 20 and a counter-support surface 23 directly in contact with the support surface 22. This surface structure 24 is designed, for example, as knurled teeth/knurling or corrugation. A toothing can therefore be implemented on each component of the interference fit 21, i.e. both on the support surface 22 and on the counter-support surface 23, via which the mounting plate 5 is also held relative to the flange element 13. At the same time as the non-positive connection, a positive connection between the mounting plate 5 and the flange element 13 is therefore also implemented as a function of the connection forces in the interference fit 21.

From the fastening region 6/plate portion 19, the mounting plate 5 runs further outwards in the radial direction towards its collar region 8, which receives a mass element 7. The collar region 8, which at the same time forms the radial outer side of the entire mounting plate 5, consequently serves to receive the mass element 7 that converts an absorber mass. The mass element 7 is fixed to the mounting plate 5/the collar region 8 via an elastomer layer 39. The vibration absorber 4 is therefore listed as an elastomer absorber.

A (plate-shaped) support area 10 extending exclusively in the radial direction is provided radially outside the fastening region 6 and radially inside the collar region 8 and at an axial distance from the hub constituent part 2. That support area 10 is located approximately axially in the center of the mass element 7. The support area 10 is consequently arranged centrally between the end faces 44a, 44b of the mass element 7 which face away from one another. The support area 10 is additionally arranged radially within the spring elements 9.

The support area 10 has at least one or a plurality of pegging bores 11 distributed in the circumferential direction, as can be seen in FIG. 2, for example. The mounting plate 5 can be supported in a desired rotational position relative to the hub constituent part 2 by the respective pegging bore 11 when the belt pulley decoupler 1 is mounted on a crankshaft.

Coming back to FIG. 1, it can also be seen in this connection that an additional positioning opening 40 is formed on the main body 12, into which a counter-holding tool can engage during assembly on the crankshaft side. With the help of this positioning opening 40 and the respective pegging bore 11, the hub constituent part 2 is supported relative to the mounting plate 5.

FIG. 2 also shows that a recess 41 is also provided in the flange element 13, which interacts with an embossed projected wart 42 on the mounting plate 5 in order to pre-align the hub constituent part 2 and the mounting plate 5 in the desired relative rotational position.

According to the disclosure, torque during operation is consequently conducted without additional friction-increasing measures in each joint from the central screw 47 to the disk area 33, which can have a Hirth toothing on its axial side facing away from the vibration absorber 4. This is achieved in that the torque is transferred to the flange element 13 and the main body 12 via the mounting plate 5 and the dome portion 20 (also referred to as the collar). In addition, the torque flow is divided in a non-positive manner (clamping force of the centering screw 47 and the interference fit 21) and, in an example embodiment, in a positive manner (via rivet bosses 42 and rivet connection 14 of the flange element 13 and the main body 12).

FIGS. 3 to 7 then show further exemplary embodiments of the belt pulley decoupler 1 according to the disclosure, wherein the structure of the pulley decoupler 1 of the respective exemplary embodiment in FIGS. 3 to 7 corresponds to the structure of the embodiment of FIG. 1. For the sake of brevity, therefore, only the differences between these first exemplary embodiments are described below.

Figure 3:
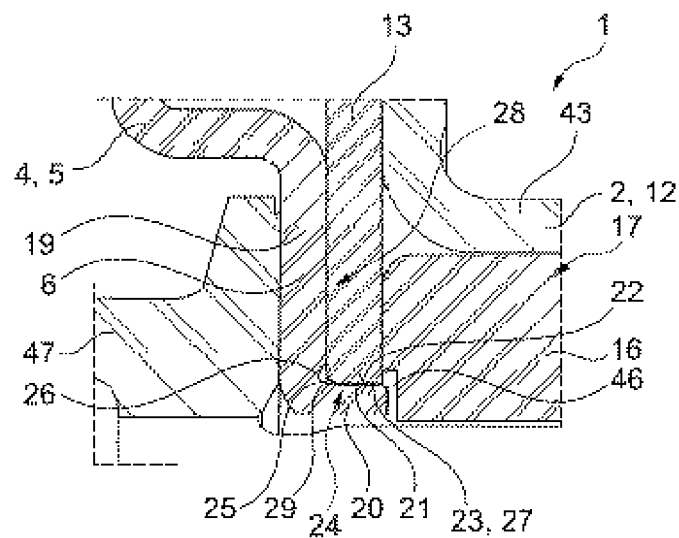
FIG. 3 shows a longitudinal sectional view of a detailed area of a pulley decoupler according to the disclosure according to a second exemplary embodiment, with a connection area between a dome portion of a mounting plate and a flange element of a hub constituent part being clearly visible.

With the second exemplary embodiment according to FIG. 3, an undercut 26 is also provided in a transition 25 from the plate portion 19 to the dome portion 20 on the axial side 28 of the mounting plate 5 facing the flange element 13. This in turn further simplifies installation.

Figure 4:
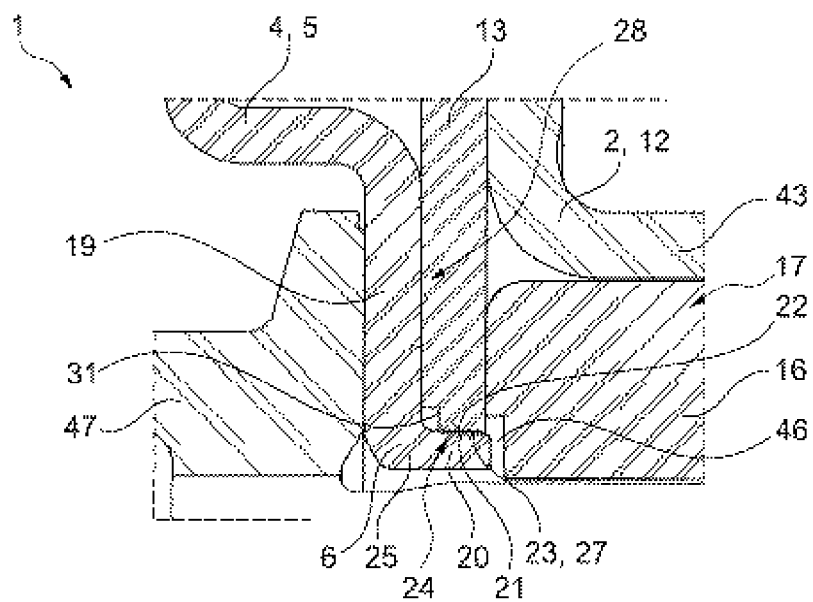
FIG. 4 shows a longitudinal sectional representation of a detailed area of a belt pulley decoupler according to the disclosure according to a third exemplary embodiment, in which instead of an undercut on the mounting plate side realized in FIG. 3, an embossing on the flange element is implemented.

Instead of this undercut 26 or in addition to the undercut 26, an embossing 31 is provided in FIG. 4 of the third exemplary embodiment. This embossing 31 is carried out in the flange element 13 instead of in the mounting plate 5, namely on a radial inside of the flange element 13 (at the radial height of the transition 25).

Coming back to FIG. 2 of the first exemplary embodiment, it can be seen that instead of the essentially rectangular embossing 31, a chamfer 29 can also be present in the flange element 13.

Figure 5:
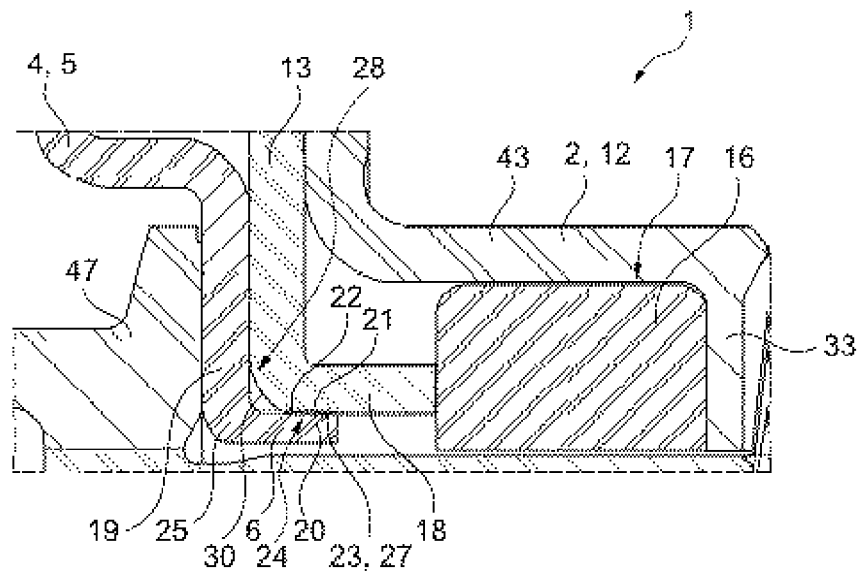
FIG. 5 shows a longitudinal sectional representation of a detail area of a pulley decoupler according to the disclosure according to a fourth exemplary embodiment, the flange element now having an axially projecting support web which is supported on an intermediate piece.

Furthermore, it can be seen in FIG. 5 of the fourth exemplary embodiment that instead of the chamfer 29 according to FIG. 2, a rounding 30 can also be provided.

The fourth exemplary embodiment in FIG. 5 also shows that an intermediate piece 16 received axially between the main body 12 and the flange element 13 can be dimensioned as small as desired. The intermediate piece 16, which can be designed as a continuously encircling ring, is positioned in a receiving space 17, which is open radially inward, between the main body 12 and the flange element 13. That receiving space 17 is delimited on a first axial side by the flange element 13, on a second axial side opposite thereto by a disk area 33 on the main body 12 and on a radial outside by a wall area 43 running axially between the disk area 33 and the flange element 13 of the main body 12.

While in FIG. 1 or in FIGS. 2 to 4, the intermediate piece 16 is supported on the exclusively radial flange element 13, in the embodiment according to FIG. 5, the flange element 13 forms an axially protruding support web 18, which is supported on the end face on the intermediate piece 16. In this embodiment, that support web 18 is at the same time a component of the interference fit 21 and is therefore designed to fix/receive the mounting plate 5.

In this context, it should be pointed out in principle that the support web 18 in further embodiments can even be designed in such a way that it comes into direct contact with the disk area 33 while the intermediate piece 16 is omitted.

A further fifth exemplary embodiment is then illustrated in connection with FIG. 6, which shows that instead of the positioning opening 40 towards a radial outer side of the main body 12 according to FIG. 1, the hub constituent part 2 is also equipped at the radial height of the respective pegging bore 11 with a through-hole 32. In this embodiment, that through-hole 32 penetrates the hub constituent part 2 completely, i.e. both the main body 12 and the flange element 13. If the corresponding retaining ring 38 and the plate spring 37 are provided, this through-hole 32 also penetrates these two elements axially.

Figure 6:
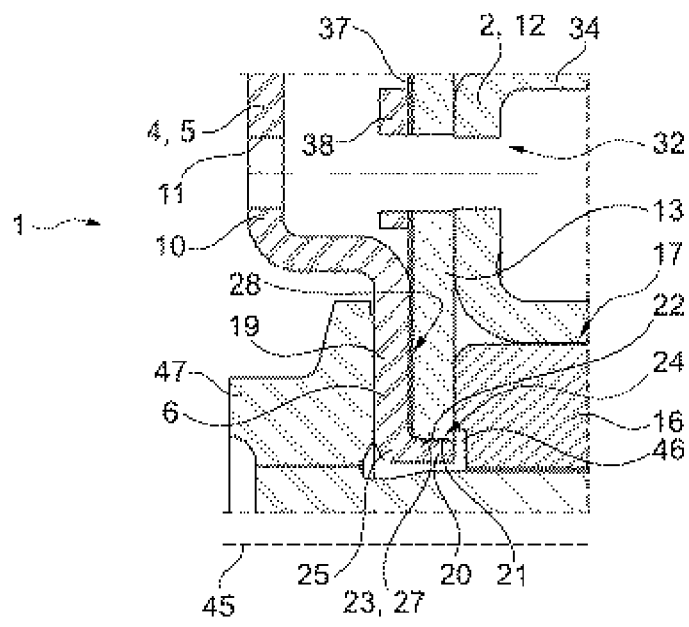
FIG. 6 shows a longitudinal sectional representation of a belt pulley decoupler according to the disclosure according to a fifth exemplary embodiment, a through-hole aligned with the pegging bore also being visible in the hub constituent part.

It can also be seen in FIG. 6 that the pegging bore 11 and the through-hole 32 are positioned radially at the same height. The through-hole 32 is also designed as a stepped bore, with those sections of the through-hole 32 as provided in the flange element 13 and optionally in the retaining ring 38 and the disk spring 37 having a larger diameter than a section introduced in the main body 12.

Also in FIG. 6 the plate spring 37 is made so wide that it is even arranged between the plate portion 19 and the flange element 13.

Figure 7:
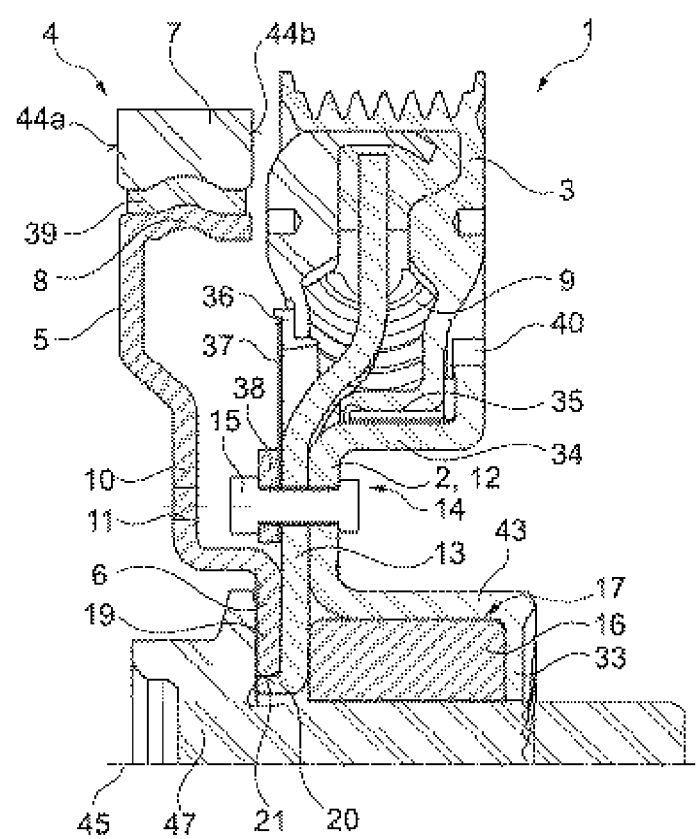
FIG. 7 shows a longitudinal sectional representation of a pulley decoupler according to the disclosure according to a sixth exemplary embodiment, the overall structure of the pulley decoupler being clearly visible and the dome portion now being implemented as a component of the flange element.
Figure 8:
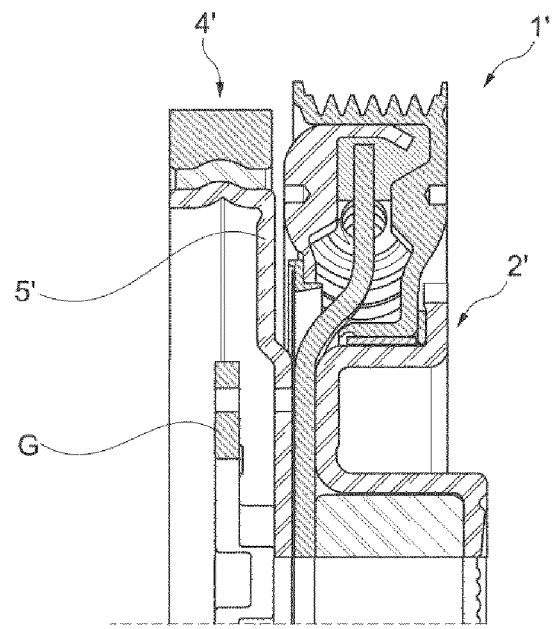
FIG. 8 shows a longitudinal sectional representation of a belt pulley decoupler already known from the prior art.
Figure 9:
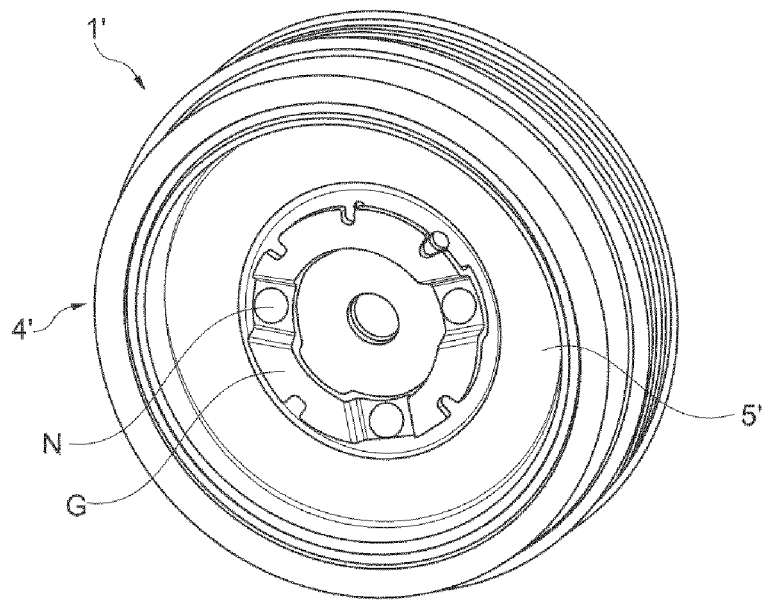
FIG. 9 is a perspective view of the prior art pulley decoupler of FIG. 8 in full view.

A further sixth exemplary embodiment is then illustrated in connection with FIG. 7, which shows that the dome portion 20 is now no longer formed on the mounting plate 5 as in FIG. 1, but on the flange element 13. The dome portion 20 is therefore a one-piece material component of the flange element 13. Consequently, the mounting plate 5 is now pressed onto the axially projecting dome portion 20 of the flange element 13/fixed by the interference fit 21.

In connection with the sixth exemplary embodiment, it should also be pointed out that the transition 25, which is implemented on the flange element 13 between the dome portion 20 and its section radially directly adjoining this dome portion 20, can be provided with the undercut 26. As an alternative to this, it is also expedient if the plate portion 19 has the chamfer 29, rounding 30 or embossing 31 on its radial inner side and on the axial side facing the section immediately radially adjoining the dome portion 20.

The surface structure 24 can be formed as in the first exemplary embodiment on the part of the support surface 22 of the dome portion 20 and on the counter-support surface 23 of the flange element 13 that is in direct contact with the support surface 22.

In other words, according to the disclosure, a primary plate (mounting plate 5) of the torsional vibration absorber (vibration absorber 4) is shaped in such a way that a contact surface (support area 10) for a counter-holder provided by the customer is formed axially and the desired pegging bores 11 are thus provided. The inside diameter of the primary plate is formed into a dome (dome portion) and forms an interference fit 21 with the inside diameter of the arc spring flange (flange element 13), which takes over the positioning of the torsional vibration absorber in the belt pulley decoupler 1 until the assembly is screwed onto the crankshaft by the customer using a central screw 47. If required, the torsional vibration absorber can be positioned relative to the belt pulley decoupler 1 during assembly by means of a wart 42 (torsional vibration absorber) drawn in the assembly line in the arc spring flange (hole). In order to rule out the formation of waves and thus leakage of the plate spring 37, a retaining plate (retaining ring 38) is riveted onto the plate spring 37.

According to a first variant, depending on the dome length (length of the dome portion 20) of the primary plate, it may be necessary to provide clearance into the intermediate piece 46. The clearance 46 is advantageously made off the tool.

The torsional vibration absorber is positioned in relation to the belt pulley decoupler 1 by means of an assembly device in the assembly line through positioning openings 40 in the hub (hub constituent part 2; on the outer circumference) and the locating hole 11 in the primary plate.

In a second variant, the difference from the first variant is that the torsional vibration absorber is positioned in relation to the belt pulley decoupler 1 by means of at least one through-hole (through-hole 32) in the hub and the locating hole 11 in the primary plate.

Furthermore, an off-tool undercut 26 is implemented on the dome in order to achieve better axial coverage of the components. In the case of toothing, corrugation or profiling of the arc spring flange on the inner diameter, a chip that forms can be received here. Alternatively or in addition to this, an embossing of the arc spring flange can be implemented.

In order to reduce the manufacturing cost of the spacer 16, it can be made shorter if the dome length of the primary lamination and that of the arc spring flange are increased to the maximum. It proves to be particularly advantageous if the rigidity of the folded dome (dome portion 20 and support web 18) is sufficient to allow the intermediate piece to be omitted completely.

LIST OF REFERENCE SYMBOLS

1 Belt pulley decoupler
2 Hub constituent part
3 Traction pulley
4 Vibration absorber
Mounting plate
6 Fastening region
7 Mass element
8 Collar region
9 Spring element
10 support area
11 Pegging bore
12 Main body
13 Flange member
14 Rivet connection
15 Rivet bolt
16 Intermediate piece
17 Receiving space
18 Support web
19 Plate portion
20 Dome portion
21 Interference fit
22 Support surface
23 Counter support surface
24 Surface structure
25 Transition
26 Undercut
27 Inner side
28 Side
29 Bevel
30 Rounding
31 Embossing
32 Through-hole
33 Disk region
34 Projection
35 Bearing
36 Friction ring
37 Plate spring
38 Retaining ring 39 Elastomer layer
40 Positioning opening
41 Recess
42 Wart
43 Wall area
44a First end face
44b Second end face
45 Axis of rotation
46 Clearance
47 Central screw

The invention claimed is:

1. A belt pulley decoupler configured for a motor vehicle drive train, the belt pulley decoupler comprising:
   a hub constituent part configured for attachment to a crankshaft of an internal combustion engine,
   a flexible drive element pulley configured to be spring-damped supported relative to the hub constituent part, and
   a vibration absorber comprising a mounting plate having:
      a fastening region,
      a collar region extending radially outwardly from the fastening region, the collar region configured to receive at least one mass element, and
      the fastening region:
         attached to the hub constituent part,
         having a plate portion supported axially on a flange element of the hub constituent part, and
         held relative to the hub constituent part via an axially extending dome portion formed either by the mounting plate or the flange element, the axially extending dome portion configured to fix the mounting plate to the hub constituent part before the belt pulley decoupler is attached to the crankshaft of the internal combustion engine.

2. The belt pulley decoupler of claim 1, wherein the axially extending dome portion:
   is a constituent part of the mounting plate,
   protrudes axially from the plate portion, and
   is supported on a radial inner side by the flange element.

3. The belt pulley decoupler according to claim 1, wherein the axially extending dome portion:
   is a constituent part of the flange element,
   protrudes axially, and
   is supported on a radial inner side by the plate portion.

4. The belt pulley decoupler according to claim 1, wherein a radial inner side of the axially extending dome portion is fastened to the flange element via an interference fit.

5. The belt pulley decoupler according to claim 1, wherein at least one of:
   a support surface of the axially extending dome portion configured to contact the flange element, or
   the flange element, or
   a counter-support surface of the mounting plate contacting the axially extending dome portion,
   is provided with a surface structure.

6. The belt pulley decoupler according to claim 1, wherein the fastening region, in a transition between the plate portion and the axially extending dome portion on a side facing the flange element is provided with an undercut.

7. The belt pulley decoupler according to claim 1, wherein the flange element has a chamfer on its radial inner side and on an axial side facing the plate portion.

8. The belt pulley decoupler according to claim 1, wherein the mounting plate forms a planar support area:
   arranged radially outwardly of the fastening region,
   arranged radially inwardly of at least one spring element supporting the hub constituent part relative to the flexible drive element pulley,
   axially spaced from the hub constituent part, and
   includes at least one pegging bore.

9. The belt pulley decoupler according to claim 8, wherein the hub constituent part has a through-hole which completely penetrates radially at a level of the support area of the mounting plate.

10. The belt pulley decoupler according to claim 9, wherein the through-hole is arranged at a same radial height as the at least one pegging bore.

11. The belt pulley decoupler of claim 1, wherein the axially extending dome portion is fastened to the mounting plate via an interference fit.

12. The belt pulley decoupler of claim 1, wherein the flange element has a rounding on its radial inner side and on an axial side facing the plate portion.

13. The belt pulley decoupler of claim 1, wherein the flange element has an embossing on its radial inner side and on an axial side facing the plate portion.

14. A belt pulley decoupler configured for a motor vehicle drive train, the belt pulley decoupler comprising:
   a hub constituent part configured for attachment to a crankshaft of an internal combustion engine,
   a flexible drive element pulley, and the hub constituent part resiliently supported relative to the flexible drive element pulley via at least one spring element,
   a torsional vibration absorber configured to receive at least one mass element, the torsional vibration absorber:
   supported axially by the hub constituent part,
   fixed to the hub constituent part via an axially extending dome portion, the axially extending dome portion configured to fix the torsional vibration absorber to the hub constituent part before the belt pulley decoupler is attached to the crankshaft of the internal combustion engine.

15. The belt pulley decoupler of claim 14, wherein the axially extending dome portion is configured within a mounting plate of the torsional vibration absorber.

16. The belt pulley decoupler of claim 15, wherein axially extending dome portion is fixed to the hub constituent part via an interference fit.

17. The belt pulley decoupler of claim 15, wherein a radially inner side of the axially extending dome portion is supported by the hub constituent part.

18. The belt pulley decoupler of claim 14, wherein the axially extending dome portion is configured within a flange element of the hub constituent part.

19. The belt pulley decoupler of claim 17, wherein the axially extending dome portion is fixed to the torsional vibration absorber via an interference fit.

20. The belt pulley decoupler according to claim 8, wherein the at least one pegging bore has an open end configured to be engaged during assembly of the belt pulley decoupler to the internal combustion engine.

* * * * *